United States Patent

[11] 3,587,363

| [72] | Inventor | Lawrence W. Rogers<br>Pensacola, Fla. |
|---|---|---|
| [21] | Appl. No. | 767,194 |
| [22] | Filed | Oct. 14, 1968 |
| [45] | Patented | June 28, 1971 |

[54] BALL PLUNGER INSTALLING AND REMOVAL TOOL
1 Claim, 5 Drawing Figs.

| [52] | U.S. Cl. | 81/53.2 |
|---|---|---|
| [51] | Int. Cl. | B25b 13/50 |
| [50] | Field of Search | 81/53.2, 71 |

[56] References Cited
UNITED STATES PATENTS

| 2,622,466 | 12/1952 | Vanden Bos et al. | 81/53.2 |
| 1,549,041 | 8/1925 | Berg | 81/53.2 |

FOREIGN PATENTS

| 346,351 | 11/1904 | France | 81/53.2 |
| 8,267 | 1903 | Great Britain | 81/53.2 |

*Primary Examiner*—James L. Jones, Jr.
*Attorney*—Stanley M. Tarter

ABSTRACT: A tool for accurately and precisely installing, and for removing threaded inserts or studs of the ball plunger type. The assembled tool comprises a holder in the shape of a large nut having a threaded bore and a boss formed at one end. A screw of predetermined length and a ball plunger are threaded into the holder with the screw tightened against the ball plunger providing an installing assembly.

PATENTED JUN28 1971 3,587,363

INVENTOR.
LAWRENCE WILLIAM ROGERS
BY Alexander Kozel
AGENT

BALL PLUNGER INSTALLING AND REMOVAL TOOL

BACKGROUND OF THE INVENTION

Ball plungers are used in conventional machine practice as workpiece locators or positioners as in locating one plate on top of another in exact relationship. Essentially, a ball plunger is a threaded stud having a spring-biased ball retained at one end thereof. The ball is biased to project above the surface of the stud and is depressible inwardly of the stud. Conventionally, the stud has a slot opposite the ball end for threading the ball plunger into a workpiece with the ball end first. Ball plungers, however, are not readily installed into a blind tapped hole when threading the ball plunger into the hole from the ball end so that the ball projects above the surface of the workpiece at a precise, predetermined level. Where a large number of ball plungers are employed it is particularly difficult to install all of the ball plungers uniformly at a precise level in a workpiece.

It is an object of the invention to provide a ball plunger installing tool that will accurately and precisely install a ball plunger in a workpiece and readily remove the same therefrom.

BRIEF DESCRIPTION OF THE INVENTION

The tool embodying the invention comprises a ball plunger holder having a threaded bore and a boss at one end thereof, and a screw having a shank of predetermined length. The screw is threaded fully into the holder opposite the boss end, and a ball plunger is threaded ball first into the boss end thereof. The ball plunger is tightened against the end of the screw to depress the ball, providing an assembled unit ready for installation into a counterbored, tapped hole in a workpiece. By providing a counterbore slightly greater in depth than the length of the boss on the holder, the ball plunger may be installed precisely with the ball projecting above the surface of the workpiece at a desired level. Use of the tool assures uniform installation of a number of ball plungers into a workpiece.

Removal of the ball plunger is accomplished by substitution of a screw of longer length than that used in the installation procedure.

DESCRIPTION OF A PREFERRED EMBODIMENT

Figure 1:
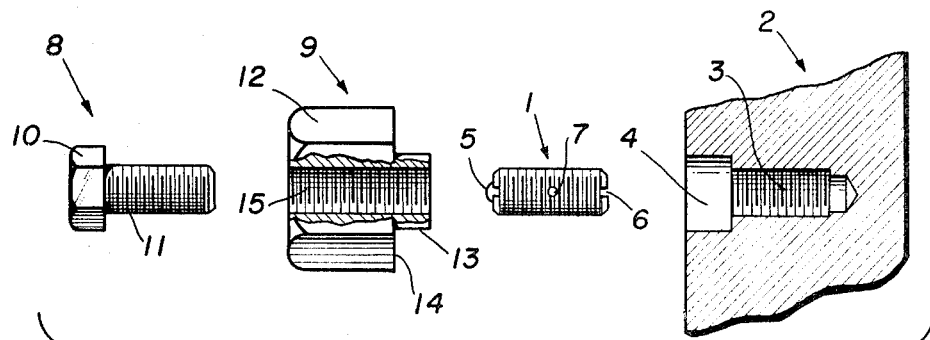
FIG. 1 is a side elevation view, partly sectioned, illustrating the ball plunger installing tool with its components disassembled, and illustrating associative components therewith.

The ball plunger installing and removal tool embodying the invention is shown in the drawing, FIGS. 1—5, in association with a threaded ball plunger 1 of conventional structure and a workpiece or plate 2 having a tapped threaded hole 3 and a counterbore 4. The ball plunger 1 has a spring-biased ball 5 projecting from one end, a threading slot 6 at its opposite end, and a plastic gripping insert 7 in its threaded shank.

The tool comprises a screw 8 and holder 9. Screw 8 has a head 10 and a shank portion 11 of predetermined length. Holder 9 is in the shape of a nut and has a wrench surface 12 at one end, a boss 13 at its opposite end and a shoulder 14 defined therebetween. A threaded bore 15 extends through holder 9.

Shank 11 of screw 8 has a predetermined length varying according to some predecided level of installation of the ball plunger, but shorter than threaded bore 15. Boss 13 has a minimum length to permit adequate thread engagement of a ball plunger therein and is slightly less in length than the depth of counterbore 4 in workpiece 2.

In the illustrated embodiment, it will be understood that all of the threaded elements have threads of the same hand, i.e., right hand.

Figures 2, 3:
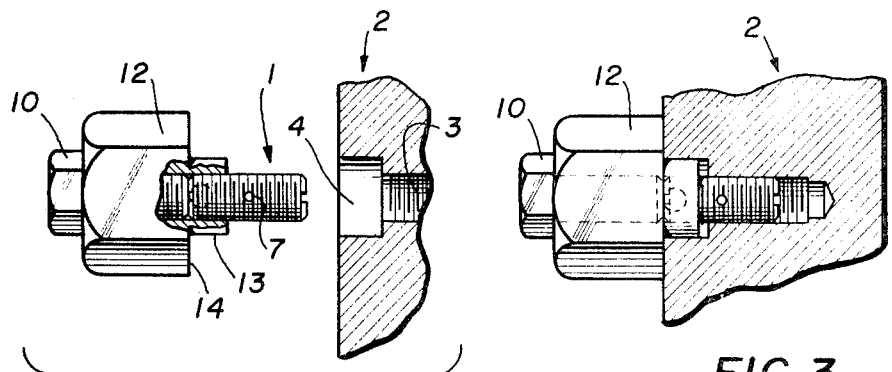
FIG. 2 is a side elevation view, partly sectioned, illustrating the tool assembled.
FIG. 3 is a side elevation view, partly sectioned, illustrating the tool positioned in a workpiece.

To install a ball plunger 1 into the workpiece 2 so that the ball 5, only, projects above the workpiece 2, screw 8 is threaded fully into the wrench end of a holder 9 with head 10 contacting holder 9. The end of screw 8 will bottom out in line with shoulder 14, in the illustrated embodiment. Ball plunger 1 is then threaded into boss 13, ball end first, to a point where ball 5 is depressed against the end of screw 8 and a portion of the plunger 1 projects from boss 13. FIG. 2 illustrates the ball plunger 1, screw 8 and holder 9 assembled.

Plunger 1 is then installed into hole 3 by screwing the plunger 1 into the hole 3 with the head 10 of screw 8 until shoulder 14 of holder 9 contacts and seats against the surface of workpiece 2. FIG. 3 illustrates the position of the members at this time.

Figures 4, 5:
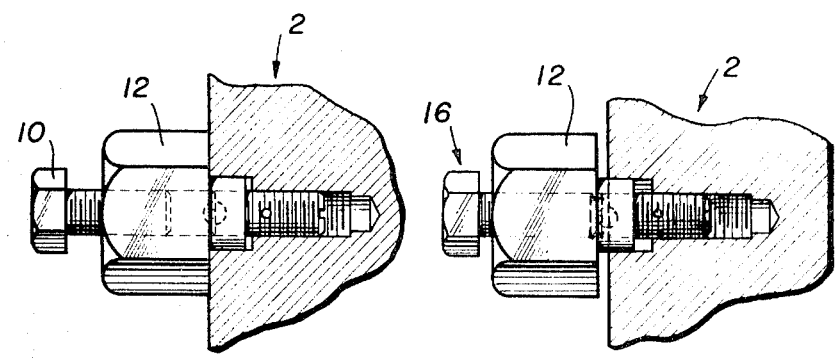
FIG. 4 is a side elevation view, partly in section, illustrating the removal of the tool from the workpiece after installation.
FIG. 5 is a side elevation view, partly in section, showing the tool used in the removal of a ball plunger from the workpiece.

It will be noted that boss 13 does not bottom out against counterbore 4 so as to prevent shoulder 14 from contacting the surface of workpiece 2. With plunger 1 threaded into workpiece 2 at the desired level, the tool is removed by backing screw 8 out of holder 9 while holding holder 9 fixedly in place, thereby releasing the force depressing ball 5 and permitting ball 5 to elevate above the surface of workpiece 2, as illustrated in FIG. 4. Next, holder 9 is back threaded and removed from plunger 1, leaving the latter precisely positioned in the workpiece 2.

To remove plunger 1 from workpiece 2, holder 9 is threaded onto the ball plunger 1 so that shoulder 14 contacts the surface of workpiece 2. While holder 9 is held in position, a screw 16, FIG. 5, of longer shank length than the installing screw 8 preferably, is threaded into holder 9 to a point where the end of screw 16 contacts and depresses ball 5 sufficiently to tightly couple with screw 16 and to apply a slight locking force against the threads of threaded bore 15 of holder 9. Since screw 16 is longer than screw 8, screw 16 will not be threaded fully into holder 9. Holder 9 is then back threaded to carry and remove plunger 1 from workpiece 2.

In the illustrated embodiment, the length of shank 11 of screw 8 was constructed to enter threaded bore 15 of holder 9 to the level of shoulder 14. By shortening the length of shank 11, the ball plunger 1 may be positioned at a higher level than illustrated and by lengthening the shank 11, the ball plunger 1 may be positioned at a lower level within workpiece 2.

I claim:

1. In a tool for threaded studs and a workpiece for receiving threaded studs the combination comprising:

means defining a tapped bore and associated counterbore in said workpiece;

a stud holder provided with a threaded bore therethrough; a wrench end; a counterbore insert end that fits slidably into and is shorter in height than the depth of said counterbore; a shoulder that joins said insert end to said wrench end and seats against workpiece; and a screw having a threaded shank of a length shorter than said threaded bore; a wrench head at one end; and a seating surface between said threaded shank and said wrench head permitting said screw to be seated and tightened against said stud holder so that a threaded stud can be threaded into said threaded bore from said insert end of said stud holder and tightened against said screw and subsequently threaded into said tapped bore with said stud holder until said shoulder of said stud holder seats against said workpiece thereby assuring precise and uniform mounting of threaded studs within said counterbored bores.